United States Patent
Büttner et al.

(10) Patent No.: US 10,027,211 B2
(45) Date of Patent: Jul. 17, 2018

(54) CAGE ROTOR OF AN ASYNCHRONOUS MACHINE

(71) Applicant: Siemens Aktiengesellschaft, München (DE)

(72) Inventors: Klaus Büttner, Hollstadt (DE); Klaus Kirchner, Ostheim (DE); Matthias Warmuth, Windshausen (DE); Nico Wolf, Trusetal (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 315 days.

(21) Appl. No.: 14/727,490

(22) Filed: Jun. 1, 2015

(65) Prior Publication Data

US 2015/0349616 A1    Dec. 3, 2015

(30) Foreign Application Priority Data

Jun. 2, 2014   (DE) .................. 10 2014 210 339

(51) Int. Cl.
| H02K 3/02 | (2006.01) |
| H02K 17/16 | (2006.01) |
| H02K 15/00 | (2006.01) |
| H02K 17/20 | (2006.01) |

(52) U.S. Cl.
CPC ....... H02K 17/165 (2013.01); H02K 15/0012 (2013.01); H02K 17/205 (2013.01); H02K 3/02 (2013.01); Y10T 29/49014 (2015.01)

(58) Field of Classification Search
CPC ............. H02K 17/165; H02K 15/0012; H02K 17/205; H02K 3/02
USPC ......................................................... 310/211
See application file for complete search history.

(56) References Cited

U.S. PATENT DOCUMENTS

| 1,777,320 A | | 7/1930 | McCollum | |
| 2,794,138 A | * | 5/1957 | Dunn, Jr. .............. | H02K 1/265 310/211 |
| 3,027,474 A | * | 3/1962 | Rosenberry, Jr. .... | H02K 17/165 310/125 |
| 3,290,526 A | | 12/1966 | Wren et al. | |

(Continued)

FOREIGN PATENT DOCUMENTS

| CN | 103141016 A | 6/2013 |
| DE | 102005030797 A1 | 1/2007 |

(Continued)

*Primary Examiner* — Forrest M Phillips
(74) *Attorney, Agent, or Firm* — Henry M. Feiereisen LLC

(57) ABSTRACT

A cage rotor of a rotary asynchronous machine includes an axially laminated core having substantially axially extending grooves, at least one electrical conductor disposed in the grooves and composed of at least of two partial conductors constructed from materials having different electrical conductivities and different mechanical strengths, wherein the partial conductor made of the higher-strength material is disposed radially farther outwardly at least in sections of the groove, as viewed along the axial extent of the respective, and a short-circuit ring arranged on a respective end face side of the laminated core and electrically-conductively interconnecting the electrical conductors that are disposed in the respective grooves and protrude axially from the laminated core.

13 Claims, 5 Drawing Sheets

(56) References Cited

U.S. PATENT DOCUMENTS

| | | | | |
|---|---|---|---|---|
| 3,659,129 A | * | 4/1972 | Pettersen | H02K 17/16 310/211 |
| 3,778,652 A | * | 12/1973 | Endress | H02K 17/165 310/211 |
| 5,637,943 A | * | 6/1997 | Berger | H02K 17/205 310/211 |
| 6,088,906 A | * | 7/2000 | Hsu | B22D 19/0054 310/211 |
| 6,246,141 B1 | * | 6/2001 | Bailey | H02K 17/205 310/211 |
| 8,274,190 B2 | * | 9/2012 | Alexander | B22D 19/0054 310/210 |
| 8,720,041 B2 | * | 5/2014 | Meyer | H02K 15/0012 29/596 |
| 8,836,193 B2 | * | 9/2014 | Buttner | H02K 17/165 310/125 |
| 8,963,394 B2 | * | 2/2015 | Buttner | B22D 19/0054 310/211 |
| 2005/0017597 A1 | | 1/2005 | Mays | |
| 2011/0175484 A1 | * | 7/2011 | Wang | H02K 15/0012 310/211 |
| 2012/0126656 A1 | * | 5/2012 | Gerard | H02K 15/0012 310/211 |
| 2012/0133236 A1 | | 5/2012 | Büttner et al. | |
| 2012/0153766 A1 | * | 6/2012 | Kleber | H02K 15/0012 310/211 |
| 2012/0169158 A1 | | 7/2012 | Büttner et al. | |
| 2012/0187796 A1 | * | 7/2012 | Buttner | B22D 19/0054 310/211 |
| 2012/0205996 A1 | | 8/2012 | Büttner et al. | |
| 2013/0127292 A1 | * | 5/2013 | Gieras | H02K 17/205 310/211 |
| 2013/0175892 A1 | | 7/2013 | Büttner et al. | |
| 2013/0187512 A1 | | 7/2013 | Büttner et al. | |
| 2013/0234543 A1 | | 9/2013 | Büttner et al. | |
| 2013/0257197 A1 | | 10/2013 | Büttner et al. | |
| 2014/0139066 A1 | | 5/2014 | Shimono et al. | |
| 2014/0217840 A1 | | 8/2014 | Büttner et al. | |
| 2015/0303781 A1 | * | 10/2015 | Brandi | H02K 15/0012 310/211 |

FOREIGN PATENT DOCUMENTS

| | | |
|---|---|---|
| DE | 102009008440 B3 | 12/2010 |
| DE | 102010041788 A1 | 4/2012 |
| DE | 102010041795 A1 | 4/2012 |
| GB | 822313 A | 10/1959 |
| JP | 04351450 A * | 12/1992 |

* cited by examiner

CAGE ROTOR OF AN ASYNCHRONOUS MACHINE

CROSS-REFERENCES TO RELATED APPLICATIONS

This application claims the priority of German Patent Application, Serial No. 10 2014 210 339.8, filed Jun. 2, 2014, pursuant to 35 U.S.C. 119(a)-(d), the content of which is incorporated herein by reference in its entirety as if fully set forth herein.

BACKGROUND OF THE INVENTION

The present invention relates to a cage rotor of an asynchronous machine with an axially laminated core having grooves running essentially axially, in which an electrical conductor is located which, with the electrical conductors in other grooves, embodies short circuit rings on the respective end face sides of the laminated core and thus forms a cage rotor.

In asynchronous motors with cage rotors, which are employed in the higher speed range, the short circuit ring in particular proves to be a weak point on the rotor. In such cases irregular expansions occur on the short circuit ring caused by centrifugal forces, which become noticeable as non-recoverable changes and to this extent as imbalance in the rotor. This occurs above all in short-circuit rings which use pure aluminum (AL99.5) as their electrically-conducting casting compound. In such cases, although the electrical conductivity value is comparatively high, this material is not suitable for high centrifugal stress.

It would therefore be desirable and advantageous to obviate prior art shortcomings and to provide an improved cage rotor of an asynchronous machine which both withstands the centrifugal stresses and also exhibits comparatively few losses.

SUMMARY OF THE INVENTION

According to one aspect of the present invention, a cage rotor of a rotary asynchronous machine includes an axially laminated core having substantially axially extending grooves, at least one electrical conductor disposed in the grooves and composed of at least two partial conductors constructed from materials having different electrical conductivities and different mechanical strengths, wherein the partial conductor made of the higher-strength material is disposed radially farther outwardly at least in sections of the groove, as viewed along the axial extent of the respective, and a short-circuit ring arranged on a respective end face side of the laminated core and electrically-conductively interconnecting the electrical conductors that are disposed in the respective grooves and protrude axially from the laminated core.

According to another aspect of the present invention, a method for manufacturing a cage rotor for an asynchronous machine includes packetizing. preferably in-die-stacking, of laminations of the cage rotor to produce a laminated core, inserting bars as partial electrical conductors into axially extending grooves of the laminated core, so that the bars protrude axially from the grooves, casting the partial electrical conductors disposed in the grooves to produce a composite electrical conductor, and simultaneously casting short-circuit rings on end faces of the laminated core.

In accordance with the invention an aluminum alloy is now used, especially $Al_9Cu_3$ or $AlSi_9Cu_3$ with $R_m=240$ N/mm$^2$ and $R_{p0.2}=140$ N/mm$^2$ with a conductivity value of only 21 m/Ohm*mm$^2$. This material has comparatively good technical properties for casting methods by being able to be cast at comparatively low temperatures.

Furthermore, through this method, the resistance to high speeds of the short-circuit ring is significantly increased, since this casting compound only enters a plastic range at higher speeds. In order to compensate for the lower conductive value in the groove, in accordance with the invention aluminum bars Al 99.7 with a conductive value of 36 m/Ohm*mm$^2$ with corresponding groove geometries and a degree of groove filling are inserted into the groove. For example, 85% of the groove is filled with the Al bar and 15% with the casting compound. The comparatively lower conductive value in the short-circuit ring can be compensated for by enlarging the cross-section by a factor of 1.7.

During casting an alloy is produced between the bar and the casting compound which, which has a permissible expandability corresponding at least to that of the casting compound. A contact surface, which extends at high speeds perpendicular to the tangential stresses due to expansion, thus does not tear off. The coefficients of expansion of the aluminum bars and of the casting compound are almost identical. The system is thus suitable for high speeds.

A conductivity value of approximately 35 m/Ohm*mm$^2$ is produced in the groove with a groove filling of approximately 40% with special copper bar and 60% casting compound $Al_9Cu_3$. The lower conductivity value in the short-circuit ring can here also be compensated by enlarging the cross-section of the conductive short circuit ring by a factor of 1.7.

However, the inserted copper bar must be designed with a geometry specifically developed for high rotation speeds so as to prevent the contact surface of the bar from tearing away from the cast short-circuit ring due to the high tangential stresses. This copper bar has specific geometries for high speeds and tangential stresses in the short-circuit ring.

The bar is coated so that an inter-metallic phase can form between bar and casting compound.

For the formation, production, geometries and behavior of the inter-metallic phases, reference is made here to U.S. Pat. No. 8,836,193, which is incorporated herein in its entirety.

The connection between the conductors and the short-circuit rings is improved in that the materials enter into a mixed-crystalline connection at suitable points. The short-circuit bars extend at both end face side ends of the laminated rotor core axially from said core and into the cast short-circuit rings.

Advantageously, the binding forces between conductor ends and short-circuit rings can be increased by coating the partial conductors—i.e. the bars made of aluminum or copper—in such a way that an alloy—i.e. a mixed-crystalline connection—forms both between the coating and the conductors and also between the coating and the cast material of the short-circuit rings.

Temperatures of approximately 200 to 250° C. can be reached in operation of the cage rotor. This means that a higher thermal expansion results in the cast groove areas. The transition between the conductors and the short-circuit rings can release in such cases, which causes a deterioration of the electrical conductivity value and in the area of the transition between the short-circuit rings and the conductors. This leads to earth contact resistances, which additionally heat up the short-circuit ring.

The laminated rotor core pressed together in the casting process for sealing reasons can also expand again axially if the connection between the partial conductors—i.e. the bars—and the cast short-circuit rings cannot apply a sufficient axial holding force.

Through the coating the conductors are bonded to the pressure casting by the maximum possible binding forces. Accordingly the connection between the conductors and the short-circuit rings remains stable, despite possible differences in thermal expansion coefficients when the cage rotor experiences marked thermal cycles in the operation of the dynamo-electric machine. At high speeds centrifugal forces acting on the rotor also to some extent cause high stresses in the conductor short-circuit ring. Furthermore an optimum electrical transfer conductivity value between the materials is achieved by the alloying.

The coating and the first alloy layer can be created by electromechanical galvanization. Here a layer of the coating material is initially deposited on the bars using electrochemical methods. In such cases the desired mixed-crystalline connection is made between the bar and the coating material in this process. If pressure cast material, i.e. Al, is subsequently applied, especially by means of the casting process, the coating melts onto the bars and likewise enters into a mixed-crystalline connection with the cast melt, so that a second alloy layer is produced.

Instead of galvanization, other coating methods are conceivable, which likewise lead to the desired mixed-crystalline connections between the materials. In such cases thermal spraying methods, especially flame spraying, plasma spraying, wire arc spraying or laser spraying are especially suitable.

This layer can likewise be created by cold spraying or by vapor deposition.

In all these methods, but especially also in galvanization, an oxide layer is removed from the conductor before coating by chemical pre-processing of this conductor. An oxide layer has insulating electrical properties so that, by the removal of said oxide layer, the earth contact resistance between the materials is markedly reduced.

For example, in this case, in a hybrid rotor with copper bars and aluminum short-circuit rings, a thin layer of aluminum is applied to the surface of the copper conductors. This can take place through galvanization. In this coating process an alloy is produced between the aluminum coating and the copper conductors. Subsequently an aluminum cast compound is sprayed into the grooves, wherein the short-circuit rings are also cast at the same time. Here the aluminum coating is melted onto the surface of the conductors and enters into a mixed-crystalline connection with the aluminum melt. In this process the second alloy layer is finally formed. In particular in the areas of the ends of the copper bars, which project out of the laminated rotor core and into the short-circuit rings, an extremely stable connection is produced between the two materials, so that the durability in relation to thermal cycles and centrifugal forces occurring during operation is increased. An almost ideal electrical and mechanical connection is produced here between the short-circuit rings made of aluminum and the copper bars.

In the casting process there can be significant chemical reactions between the coated partial conductors, i.e. the bars, and the melt. In order to avoid too great a removal from the bars by the melt which is in contact with the bars, in an advantageous embodiment of the invention, the coating and the alloy layers can be disposed exclusively at the end areas of the conductor protruding from the laminated core and into the short-circuit rings. The said end areas represent a critical connection point between the conductors and the short-circuit rings. Accordingly the strong crystalline connection between the materials and partial conductors involved is especially important here.

Also the electrical conductance between the two materials is to be assigned a special importance, above all in this end area of each conductor, since the current flow here goes from the conductors over to the short-circuit rings. On the other hand even with a rotor manufactured by means of casting a strong crystalline connection of the conductors in the areas within the groove is less important, since no current flow between the partial conductors is to be expected here.

A harder alloy, e.g. $AlCu_2$, which has a lower ability to expand than the two partners copper and casting compound to be connected, forms on the contact surface between bar and casting compound. In order to now prevent the bar tearing away from the short circuit ring at high speed, special contours are now provided in the bar, through which surfaces have been created which run in an almost equal alignment with the direction of the tangential stresses. These contact surfaces are thus stressed for shearing, in addition a form fit is produced from the contour of the bar.

In a further form of embodiment the short-circuit ring has a support ring and thus prevents a plastic expansion because of centrifugal forces at speeds with circumferential speeds greater than 125 m/s. The support ring is manufactured from a material of which the thermal expansion corresponds to that of the short-circuit ring to be supported, e.g. EN AW-7075. Preferably it consists of an aluminum alloy with very high tensile strength.

The support ring can also be obtained from an extruded material which has the necessary material characteristics.

In particular high-strength aluminum alloys are suitable here, which achieve tensile strengths in the range of 500 $N/mm^2$. These high-strength aluminum alloys with a coefficient of thermal expansion of $23.6 \times 10^{-6}$ m/(m·K) correspond to the coefficient of thermal expansion of pure aluminum.

In accordance with the invention the reduced electrical conductivity of the casting compound is compensated for at high speeds by incorporation of aluminum or copper bars in the groove. Thus a high suitability for speed of the asynchronous machine with simultaneously high conductivity value in the groove is achieved. At particularly high speeds a flowing of the casting compound is prevented by interaction of the support ring. The material of the support ring has an equivalent coefficient of thermal expansion to that of the short-circuit ring while at the same time having high tensile strength. This enables a temperature range of −40° C. to +250° C. of the dynamo-electric machine to be insured. Speeds ranging from 200 to 230 m/s circumferential speed can thus be realized for inventive cage rotors.

The permissible yield strength of the support ring can thus only be used for the load from centrifugal force at high speed and is not already "used up" by the thermal expansion of the short-circuit ring. Therefore an aluminum alloy with tensile strength of 540 $N/mm^2$ is already sufficient.

With a high-strength aluminum alloy, e.g. AL7075 with high tensile strength, speed increases of up to 70% can thus be achieved compared to conventional arrangements, wherein this especially covers specifications from motor vehicle technology (motors for electrically-driven automobiles and buses, pure electric and hybrid drives) or in compressor technology.

If the head area of the grooves of the rotor is cast with aluminum alloy instead of Al99.5, because of the higher strength of this material, the casting compound is prevented from flowing out of the groove. Thus almost open, half-open grooves or grooves with a comparatively narrow groove slot can be provided in the laminated rotor package, which because of the stray inductivity of these grooves, are suitable for use of these rotors in converters.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
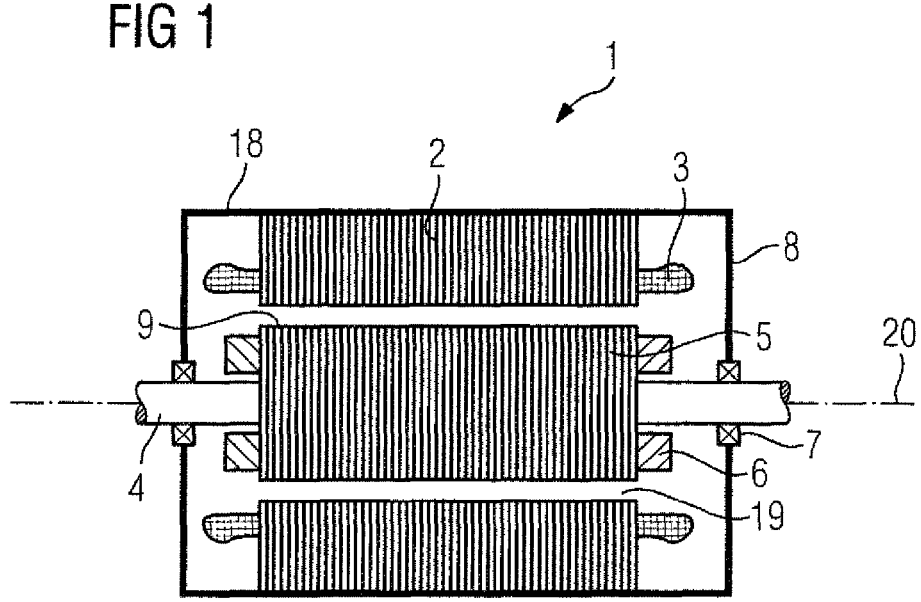
FIG. 1 shows a basic longitudinal section through an electrical machine.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown in a basic diagram a longitudinal section of an dynamo-electric machine, which is designed as an asynchronous motor, wherein a housing 18, which accommodates end shields 8, holds a shaft 4 to which a rotor or armature 5 with its laminated core is connected in a torsion-proof manner. The rotor or the armature 5 is also referred to within the field of this invention as a cage rotor. The shaft 4 in this case rotates about an axis 20. On the end face sides of this laminated core there is a short-circuit ring 6 in each case which electrically connects the conductors of the rotor 5 emerging axially from the grooves 9 on the end face sides. Located radially outside the rotor 5, spaced from it by an air gap 19, is a stator 2, which on its end face sides has winding heads of a winding system 3.

Figure 2:
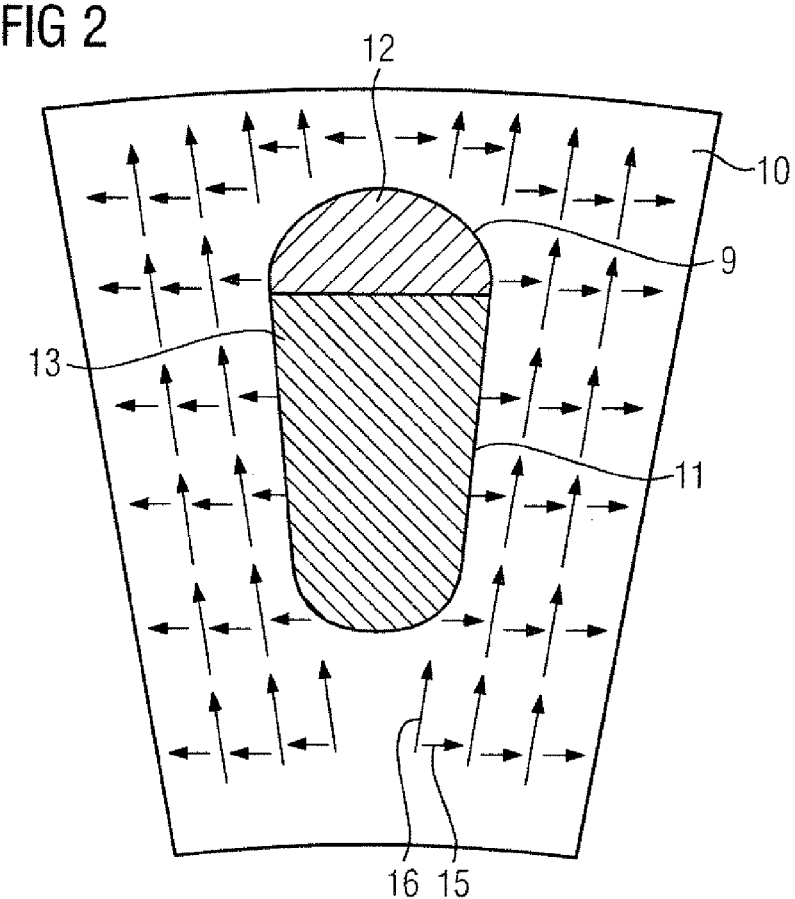
FIG. 2 shows a partial cross-section of a rotor according to the present invention.

FIG. 2 shows, in a partial cross-section of the rotor 5 transverse to an axis 20, two partial conductors, a bar made of aluminum and a partial conductor in the groove head area in aluminum alloy. The tangential stress 15 and radial stresses 16 occurring during operation of the asynchronous motor are—as also in the following figures—identified by arrows in this section of the rotor 5. A contact surface 11 is present between the rotor lamination and the conductor bar 13.

Figure 3:
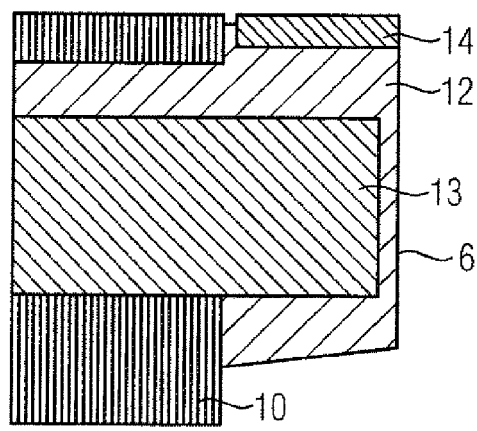
FIG. 3 shows a partial longitudinal section of a rotor according to the present invention.

FIG. 3 shows, in a partial longitudinal section, a short-circuit ring 6 of a rotor 5 according to FIG. 2, which is supported by a support ring 14 in relation to radial forces—i.e. centrifugal forces—during operation of the asynchronous motor. A partial conductor 13—i.e. a bar—projects axially beyond the end face of the laminated core 10 of the rotor 5 into the short-circuit ring 6. The groove head is also designed here in an aluminum alloy.

Figure 4:
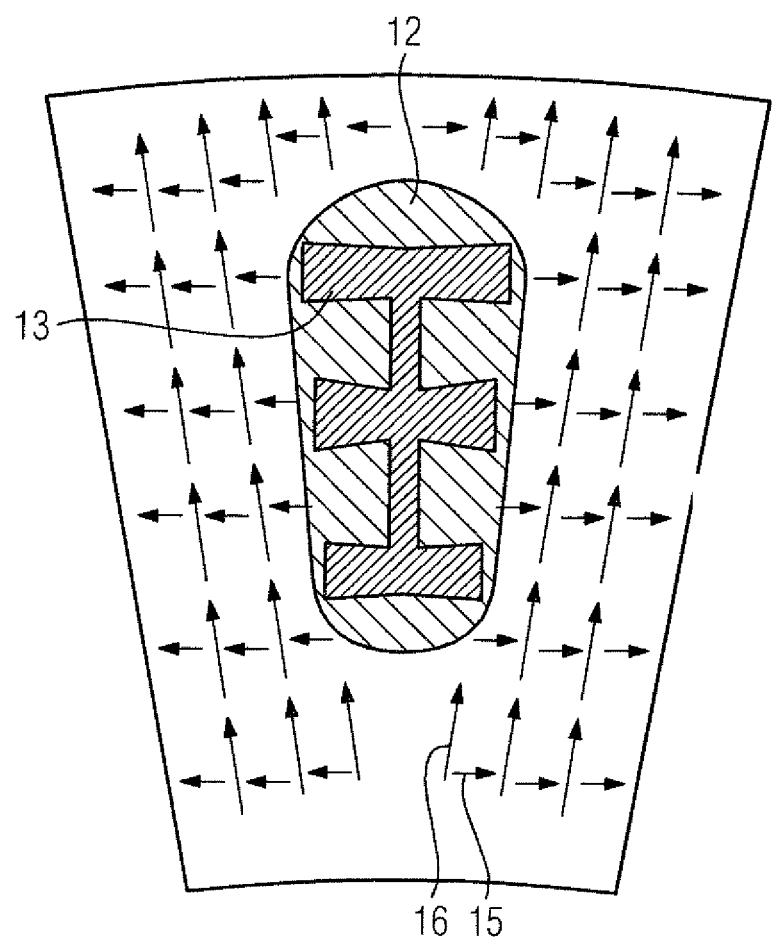
FIGS. 4 and 5 show a partial cross-section of a rotor according to the present invention.
Figure 5:
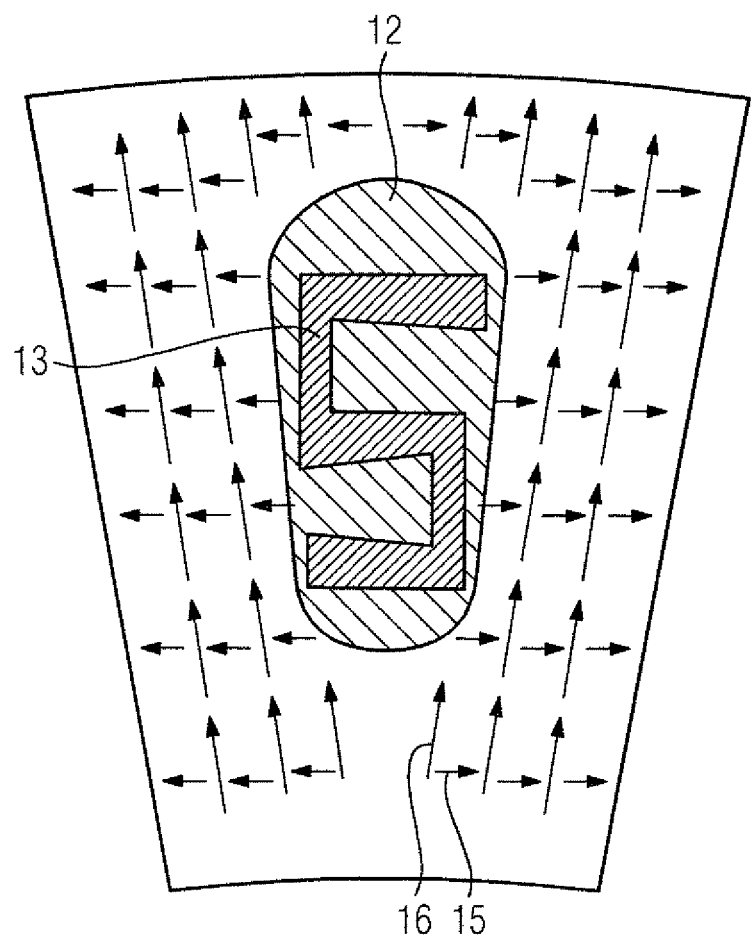

FIG. 4 and FIG. 5 show a short-circuit ring in cross-section with special bars, i.e. partial conductors 13 for high-speed, wherein the radial and tangential stresses are also shown in this figure by arrows. The conductor bar 13 is embodied according to FIG. 4 as a type of comb and according to FIG. 5 in an S shape, in order to create a contact surface of the bar contour which is as large as possible within the short-circuit ring 6. In this case the conductor bars or partial conductors 13 are embodied over the entire axial length as a type of comb or in an S shape there are also versions possible in which the partial conductors 13 are only embodied in sections, i.e. for example only in the area of the short-circuit rings, with an enlarged contact surface, i.e. for example as a type of comb, as a type of double comb, in the shape of a toothed wheel, in a star shape or in the shape of an S.

Basically other shapes of the partial conductors 13 enlarging the surface are also possible, one of the deciding factors is whether the desired contacting of the partial conductor 13 in the short-circuit ring 6 is achieved by the enlargement of the surface.

Figure 6:
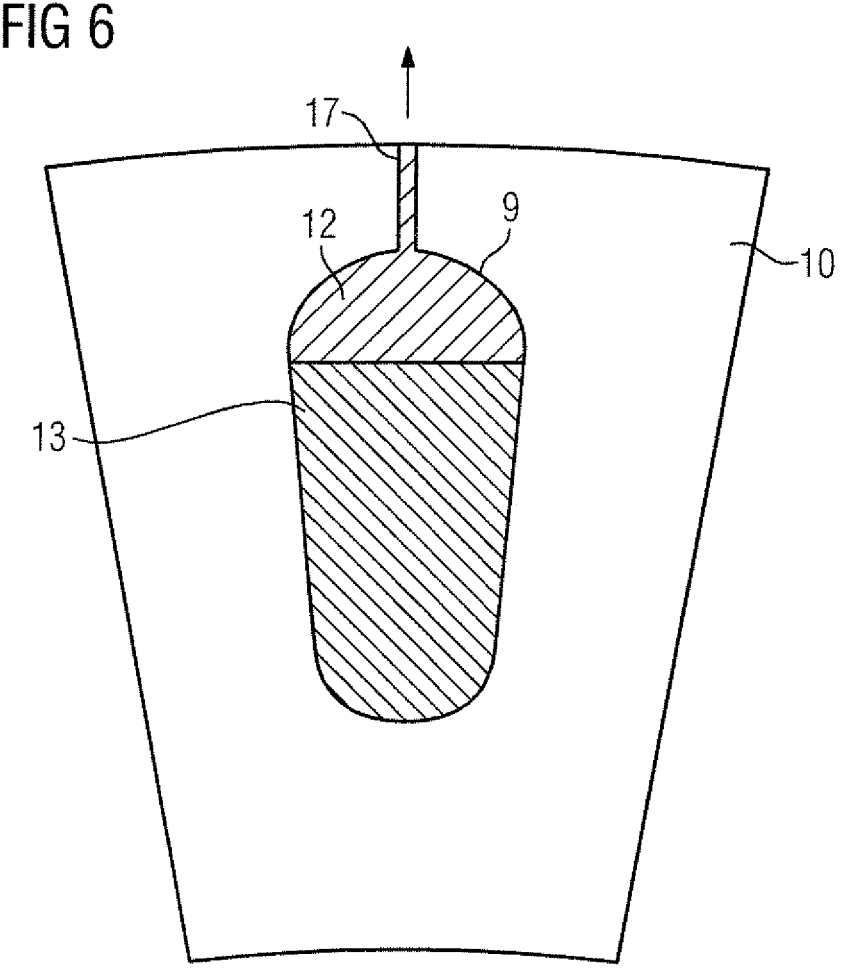
FIG. 6 shows a partial longitudinal section of the laminated rotor core according to the present invention.

FIG. 6 shows a partial cross-section of a groove 9, which is embodied in the direction of the air gap 18 by a groove slot 17, wherein the partial conductor 12 protrudes in the groove head area into the groove slot 17. Depending on the width of the groove slot 17, a stray inductivity arises which can be advantageous for operating the dynamo-electric machine as a converter.

If the head area of the grooves of the rotor is cast with an aluminum alloy, e.g. $AlSi_9Cu_3$ instead of Al99.5, because of the higher strength of this aluminum alloy, the casing compound is prevented from "flowing out" of the groove 9 during operation because of the centrifugal forces. During the casting the groove slot 17 is sealed from the outside. Thus almost open, half-open grooves 9 or grooves 9 with a comparatively small groove slot 17 can be provided in the laminated rotor core.

The following versions of the cage rotor are for example designed especially for high speeds and are therefore especially suitable for applications in motor vehicle technology in E-cars (direct or hybrid drive) and are suitable for compressor drives. Naturally further material combinations of a cage rotor are possible, provided materials with similar material characteristics are used.

Thus for example a cage rotor with bars or partial conductors 13 made of pure Al, a casting material $AlSi_9Cu_3$, which at least partially surrounds the bar and with a support ring 14 made of the alloy AW7075 have a comparatively high conductivity value with a very high suitability for speed use. In this case bar and casting compound have the same coefficients of expansion. The bonding of the bar to the short-circuit ring 6 is especially successful because of the two aluminum components.

A cage rotor with bars or partial conductors 13 made of copper, a casting material $AlSi_9Cu_3$, which at least partially surrounds the bar, and with a support ring 14 made of the alloy AW7075 have a comparatively high conductivity value with a very high suitability for speed use. However—as stated above—special contours of the copper bar are necessary in order to obtain a sufficient bar bonding of the copper bars in the cast short-circuit ring 6.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A cage rotor of a rotary asynchronous machine, comprising
    an axially laminated core having substantially axially extending grooves,
    electrical conductors disposed in the grooves respectively and protruding axially from the laminated core, and composed of at least of two partial electrical conductors constructed from materials having different electrical conductivities and different mechanical strengths, wherein a first one of the at least two partial electrical conductors made of a material having a higher strength is disposed radially farther outwardly at least in sections of the groove compared to the material of a second one of the at least two partial electrical conductors, as viewed along the axial extent of the respective groove, said at least two partial electrical conductors having a contact surface between each other, said contact surface including an alloy containing aluminum and copper, and
    a short-circuit ring arranged on a respective end face side of the laminated core and electrically-conductively interconnecting the electrical conductors that are disposed in the respective grooves,
    wherein the short-circuit ring comprises at least one support ring made of an aluminum alloy and disposed at a radially outer circumference of the short-circuit ring.

2. The cage rotor of claim 1, wherein the axially extending grooves are, at least in sections of the groove, partially closed.

3. The cage rotor of claim 1, wherein at least one of the at least two partial conductors is formed as a preformed solid conductor.

4. The cage rotor of claim 3, wherein the preformed solid conductors have contours, with surfaces that are substantially aligned with a direction of tangential stresses.

5. The cage rotor of claim 4, wherein the contours are comb-shaped or double-comb-shaped.

6. The cage rotor of claim 3, wherein the solid conductor has an S shape.

7. The cage rotor of claim 1, wherein the cage rotor is connected to a rotor shaft with a rotation lock and is suitable for rotation speeds resulting in circumferential speeds of the cage rotor of greater than 125 m/s.

8. A method for manufacturing a cage rotor for an asynchronous machine, comprising:
    packetizing laminations of the cage rotor to produce a laminated core,
    inserting electrically conducting bars that form partial electrical conductors into axially extending grooves of the laminated core, so that the bars protrude axially from the grooves,
    casting the partial electrical conductors disposed in the grooves with an electrically conducting alloy containing aluminum and copper having a higher mechanical strength than the electrically conducting bars to produce a composite electrical conductor,
    simultaneously casting short-circuit rings on end faces of the laminated core, and
    attaching a support ring made of an aluminum alloy on an outer circumference of the short-circuit rings.

9. The method of claim 8, wherein the laminations are packetized by in-die-stacking.

10. The method of claim 8, further comprising coating the bars before insertion into the axially extending grooves.

11. A vehicle drive or compressor drive with a rotary asynchronous machine having a cage rotor according to claim 1.

12. The cage rotor of claim 1, wherein the alloy contains aluminum, copper and silicium.

13. A cage rotor of a rotary asynchronous machine, comprising
    an axially laminated core having substantially axially extending grooves,
    electrical conductors disposed in the grooves respectively and protruding axially from the laminated core, and composed of at least of two partial electrical conductors constructed from materials having different electrical conductivities and different mechanical strengths,
    wherein a first one of the at least two partial electrical conductors made of a material having a higher strength is disposed radially farther outwardly at least in sections of the groove compared to the material of a second one of the at least two partial electrical conductors, as viewed along the axial extent of the respective groove,
    wherein at least one of the at least two partial conductors of the cage rotor is formed as a preformed solid conductor,
    wherein the solid conductor is S-shaped, comb-shaped or double-comb-shaped at least in sections, and
    a short-circuit ring arranged on a respective end face side of the laminated core and electrically-conductively interconnecting the electrical conductors that are disposed in the respective grooves,
    wherein the short-circuit ring comprises at least one support ring made of an aluminum alloy and disposed at a radially outer circumference of the short-circuit ring.

* * * * *